US009600507B2

(12) United States Patent
Li et al.

(10) Patent No.: US 9,600,507 B2
(45) Date of Patent: Mar. 21, 2017

(54) INDEX STRUCTURE FOR A RELATIONAL DATABASE TABLE

(71) Applicant: International Business Machines Corporation, Armonk, NY (US)

(72) Inventors: Lei Li, Beijing (CN); Peng Li, Beijing (CN); Xi Ning Wang, Beijing (CN); Ya Xin Wu, Beijing (CN); Ying Hua Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/316,911

(22) Filed: Jun. 27, 2014

(65) Prior Publication Data

US 2015/0026189 A1    Jan. 22, 2015

(30) Foreign Application Priority Data

Jul. 19, 2013    (CN) .......................... 2013 1 0306279

(51) Int. Cl.
    *G06F 7/00*       (2006.01)
    *G06F 17/30*      (2006.01)

(52) U.S. Cl.
    CPC .. *G06F 17/30321* (2013.01); *G06F 17/30011* (2013.01); *G06F 17/30424* (2013.01); *G06F 17/30595* (2013.01); *G06F 17/30911* (2013.01)

(58) Field of Classification Search
    CPC ......... G06F 17/30911; G06F 17/30321; G06F 17/30595; G06F 17/30923
    USPC ....................................................... 707/741
    See application file for complete search history.

(56) References Cited

U.S. PATENT DOCUMENTS

| | | | | |
|---|---|---|---|---|
| 5,852,820 | A | * | 12/1998 | Burrows ........... G06F 17/30622 |
| 8,260,784 | B2 | | 9/2012 | Beyer et al. |
| 2004/0267900 | A1 | * | 12/2004 | Hoekstra ........... G06F 17/30905 709/217 |
| 2006/0053122 | A1 | * | 3/2006 | Korn ................. G06F 17/30914 |

(Continued)

FOREIGN PATENT DOCUMENTS

CN    102158482 A    8/2011

OTHER PUBLICATIONS

Json, "JavaScript Object Notation", Elevate Software, Mar. 2014, 3 pages.

(Continued)

*Primary Examiner* — Binh V Ho
(74) *Attorney, Agent, or Firm* — Cantor Colburn LLP; Dan Simek

(57) ABSTRACT

Embodiments are directed to building an index structure for a relational database (RDB) table and for querying the RDB table. An aspect includes obtaining JSON documents from a RDB table, identifying JSON objects in the JSON documents and assigning identifiers for them, and building an index structure according to values in the JSON objects such that the index structure includes at least one node that records values in a JSON object and includes the identifier of the specific JSON object. Querying the RDB table includes receiving a query request including an indicator which indicates that the query is to be performed on JSON objects, and searching the index structure based on query conditions in the query request so as to determine a target JSON object that meets the query conditions.

12 Claims, 5 Drawing Sheets

(56) References Cited

U.S. PATENT DOCUMENTS

| | | | |
|---|---|---|---|
| 2006/0074635 A1* | 4/2006 | Gilbert | G06F 17/3041 704/9 |
| 2006/0224627 A1* | 10/2006 | Manikutty | G06F 17/30938 |
| 2007/0061092 A1* | 3/2007 | Meijer | G06F 17/30569 702/100 |
| 2008/0172357 A1* | 7/2008 | Rechis | G06F 17/3087 |
| 2009/0019077 A1* | 1/2009 | Baby | G06F 17/30938 |
| 2010/0211572 A1* | 8/2010 | Beyer | G06F 17/30864 707/742 |
| 2010/0228734 A1* | 9/2010 | Murthy | G06F 17/30911 707/741 |
| 2011/0289141 A1 | 11/2011 | Pletter et al. | |
| 2011/0302189 A1* | 12/2011 | Liu | G06F 17/30929 707/769 |
| 2012/0185373 A1* | 7/2012 | Grody | G06Q 40/04 705/37 |
| 2014/0280047 A1* | 9/2014 | Shukla | G06F 17/30964 707/722 |

OTHER PUBLICATIONS

Saracco et al., "Query social media and structured data with InfoSphere Biginsights," IBM, Developer Works, Aug. 2012, 24 pages.

\* cited by examiner

| Patient ID | Patient Name | Hospital Records |
|---|---|---|
| 10001 | User 1 | ```<br>{<br>  "_id":objected("5034758622cc22")<br>  "name": "user1",<br>  "records":[<br>    {<br>      "hospitalName": "hospitalA",<br>      "symptom": "symptom A"<br>    }<br>    { "hospitalName": "hospitalB",<br>      "symptom": "symptom B"<br>    }<br>  ]<br>}<br>``` |
| 10002 | User 2 | ```<br>{<br>  "_id":objected("50347532622cc22")<br>  "name": "user2",<br>  "records":[<br>    {<br>      "hospitalName": "hospital A",<br>      "symptom": "symptom C"<br>    }<br>    { "hospitalName": "hospital B",<br>      "symptom": "symptom C"<br>    }<br>    { "hospitalName": "hospital C",<br>      "symptom": "symptom A"<br>    }<br>    { "hospitalName": "hospital B",<br>      "symptom": "symptom A"<br>    }<br>  ]<br>}<br>``` |
| 10003 | User 3 | ```<br>{<br>  "_id":objected("5056532622cc22")<br>  "name": "user3",<br>  "records":[<br>    {<br>      "hospitalName": "hospitalC",<br>      "symptom": "symptom B"<br>    }<br>    { "hospitalName": "hospital D",<br>      "symptom": "symptom A"<br>    }<br>    { "hospitalName": "hospital B",<br>      "symptom": "symptom D"<br>    }<br>  ]<br>}<br>``` |

Fig. 1A

| Patient ID | Patient name | Hospital Name | Symptom |
|---|---|---|---|
| 10001 | User 1 | Hospital A | Symptom A |
| 10001 | User 1 | Hospital B | Symptom B |
| 10002 | User 2 | Hospital A | Symptom C |
| 10002 | User 2 | Hospital B | Symptom C |
| 10002 | User 2 | Hospital C | Symptom A |
| 10002 | User 2 | Hospital B | Symptom A |
| 10003 | User 3 | Hospital C | Symptom B |
| 10003 | User 3 | Hospital D | Symptom A |
| 10003 | User 3 | Hospital B | Symptom D |

```
                          ┌─────────────────────────────┐ 31
                          │ obtaining JSON documents     │
                          │ included in a RDB table      │
                          └──────────────┬──────────────┘
                                         │
                                         ▼
                          ┌─────────────────────────────┐ 33
                          │ identifying a plurality of   │
                          │ JSON objects in the JSON     │
                          │ documents and assigning      │
                          │ identifiers for them         │
                          └──────────────┬──────────────┘
                                         │
                                         ▼
                          ┌─────────────────────────────┐ 35
                          │ building an index structure  │
                          │ according to values in the   │
                          │ JSON objects such that the   │
                          │ index structure includes at  │
                          │ least one node which records │
                          │ values in a specific JSON    │
                          │ object and includes an       │
                          │ identifier of the specific   │
                          │ JSON object                  │
                          └─────────────────────────────┘
```

Fig. 3

| JSON object | Document ID | Object ID |
|---|---|---|
| Hospital A, Symptom A | Row 0 | 0 |
| Hospital B, Symptom B | Row 0 | 1 |
| Hospital A, Symptom C | Row 1 | 0 |
| Hospital B, Symptom C | Row 1 | 1 |
| Hospital C, Symptom A | Row 1 | 2 |
| Hospital B, Symptom A | Row 1 | 3 |
| Hospital C, Symptom B | Row 2 | 0 |
| Hospital D, Symptom A | Row 2 | 1 |
| Hospital B, Symptom D | Row 2 | 2 |

Fig. 4

INDEX STRUCTURE FOR A RELATIONAL DATABASE TABLE

CROSS-REFERENCE TO RELATED APPLICATIONS

This application claims priority to Chinese Patent Application No. 201310306279.1, filed 19 Jul. 2013, and all the benefits accruing therefrom under 35 U.S.C. §119, the contents of which in its entirety are herein incorporated by reference.

BACKGROUND

The present disclosure relates to relational databases, and more specifically, to building an index structure for a relational database table that includes JSON documents and for querying the same.

A relational database (RDB) is a database which represents various entities in the real world, as well as various relationships between entities using a relational model and is built based on such relational model. The RDB is a widely used type of database. The RDB stores data in the form of tables and uses a standard data query language (SQL) to execute data queries.

With the rise of Internet web 2.0 websites, non-relational databases, also called NoSQL (Not only SQL), are becoming more widely used for network data access. Compared with conventional RDB management systems (RDBMSs), NoSQL is not limited to fixed table structures, and thus has more flexible data storage formats. Correspondingly, NoSQL does not use the SQL language as a main query language. NoSQL has a distributed flexible architecture to achieve high extensibility and high availability. Furthermore, NoSQL is capable of effectively storing large amounts of data, as well as processing a large number of read-write access requests with high concurrency.

In order to make RDBs more flexibly support various forms of data storage such as the NoSQL, it has been proposed to introduce JSON documents in the RDB. JSON (JavaScript Object Notation) is a lightweight data exchange format. JSON uses a text format which is totally independent of the language, so it is easy for developers to read and compile, lends itself well for machine parsing and generating and, thus, is regarded as an ideal data exchange language. By introducing JSON documents, a plurality of objects may be recorded in an item of a table so as to extend the recording capacity of RDBs.

SUMMARY

According to embodiments of the present invention, there is provided a solution for performing queries directed to JSON objects in a RDB table.

According to one embodiment, there is provided a method for building an index structure for a relational database table. The method includes obtaining at least one JSON document from the relational database table, identifying a plurality of JSON objects in the at least one JSON document and assigning identifiers for the plurality of JSON objects, and building the index structure according to values in the plurality of JSON objects such that the index structure includes at least one node which records the values in one of the plurality of JSON objects and includes a corresponding identifier of the JSON object.

According to another embodiment, there is provided a method for querying a relational database table. The method includes receiving a query request including an indicator which indicates that a query subject to the query request is to be performed on JSON objects in at least one JSON document included in the relational database table. The method also includes searching an index structure based on query conditions in the query request so as to determine a target JSON object that meets the query conditions.

According to further embodiment, there is provided an apparatus for building an index structure for a relational database table. The apparatus includes a document obtaining unit configured to obtain at least one JSON document from the relational database table, an identifying unit configured to identify a plurality of JSON objects in the at least one JSON document and assign identifiers for the plurality of JSON objects, and an index building unit configured to build the index structure according to values in the plurality of JSON objects such that the index structure includes at least one node which records the values in one of the plurality of JSON objects and includes a corresponding identifier of the one of the plurality of JSON objects.

According to another embodiment, there is provided an apparatus for querying a relational database table. The apparatus includes a receiving unit configured to receive a query request including an indicator which indicates that a query subject to the query request is to be performed on JSON objects in at least one JSON document included in the relational database table. The apparatus also includes a querying unit configured to search an index structure based on query conditions in the query request so as to determine a target JSON object that meets the query conditions.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIGS. 1A-1B illustrate RDB tables;

FIG. 2 shows a computer system/server according to an embodiment;

FIG. 3 shows a flowchart of a method for building an index structure according to an embodiment;

FIG. 4 shows identifiers assigned for JSON objects according to an embodiment;

DETAILED DESCRIPTION

Figures 1B, 2:
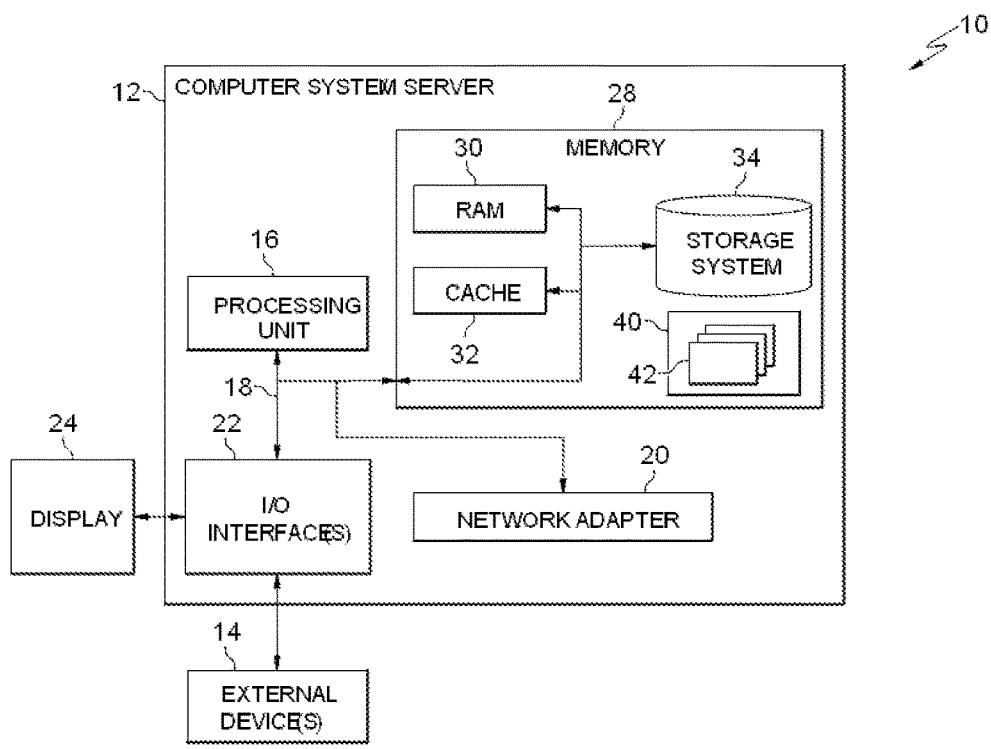

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning to FIG. 1, tables are shown for storing patient medical data in a RDB, wherein FIG. 1A shows a table including JSON documents, and FIG. 1B shows a table for storing the same data content. Specifically, the table shown in FIG. 1A defines 3 fields respectively in 3 columns: patient ID, patient name and hospital records, wherein the patient ID and patient name are conventional fields, and the column of hospital records is defined as a long field (also referred to as blob), and thus includes JSON documents. According to characteristics of JSON language, a pair of "{ }" is used to define a JSON object in a JSON document, and the JSON object may be represented with one or more pairs of key/value. For instance, the first row (marked as Row 0) of the table uses a JSON document to describe hospital records of a first patient (user1), and the JSON document includes two JSON objects; the first JSON object is represented by two pairs of keys/value: "hospitalName":"hospital A" and "symptom":"symptom A". In other words, the first JSON object corresponds to a portion of hospital record of user1 who went to "hospital A" for "symptom A". The second JSON object is also represented by two pairs of key/value, and it corresponds to hospital record of user1 who went to "hospital B" for "symptom B". Therefore, the JSON document actually describes two pieces of hospital records. Similarly, the second row (marked as Row 1) of the table uses another JSON document to describe 4 pieces of hospital records of a second patient, and the third row (marked as Row 2) of the table uses yet another JSON document to describe 3 pieces of hospital records of a third patient. If a conventional RDB table is used to store the patient information and hospital records above, it needs to use at least 4 columns to record patient ID, patient name, hospital name and symptoms, respectively, and at least 9 rows to record the 9 pieces of hospital records above, as shown in FIG. 1B. It can be seen comparing FIG. 1A to FIG. 1B, expressions of a RDB table can be more flexible and support more storing forms by introducing JSON documents.

However, for a database table in which JSON documents are introduced, the query method suitable for a conventional database table usually shows its deficiency. For instance, as to the table shown in FIG. 1A, in an example, it is desired to query a patient who went to "hospital A" for "symptom A". According to the current SQL query form, typically, the query can be performed using the following query conditions: where JSON_VAL ("records.hospitalName")="hospital A" AND JSON_VAL ("records.symptom")="symptom A". The query conditions are equivalent to selecting a JSON document which includes both of "hospital A" and "symptom A" at the same time in the hospital record field. It can be seen, besides the patient user1, the JSON document corresponding to the patient user2 may also include "hospital A" and "symptom A", though the user2 actually went to "hospital A" for "symptom C" and went to "hospital C" for "symptom A". In other words, the query above may return both of user1 and user2 at the same time while the user2 is not the correct desired result. Therefore, for a table which includes JSON documents, the existing query method does not meet the requirement on query granularity and query precision.

According to some embodiments, an index structure is built and queries can be conducted and directed to JSON objects in a RDB table, so as to reduce the query granularity and improve the query precision.

Referring now to FIG. 2, an exemplary computer system/server 12 which is applicable to implement the embodiments described herein is shown. Computer system/server 12 is only illustrative and is not intended to suggest any limitation as to the scope of use or functionality of embodiments described herein.

As shown in FIG. 2, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Below, respective embodiments will be described with reference to Figures. In these embodiments, for a RDB table in which JSON documents are introduced, JSON objects in the JSON documents are identified and assigned with identifiers and then an index structure is built for these JSON objects. Specifically, in the index structure, nodes are made to include the identifiers of the JSON objects as pointers. Thus, a specific JSON object can be directly reached by the index structure. Correspondingly, a new query grammar may be defined to indicate that query is to be conducted on JSON objects in the RDB table. Upon receiving a query request including such a query grammar, JSON objects in the table may be queried based on the index structure built above. Therefore, using the newly built index structure above, query of JSON objects in RDB table may be realized so as to reduce the query granularity and improve the query precision.

Now reference is made to FIG. 3 in which a flowchart of a method for building an index structure according to an embodiment is shown. As shown in FIG. 3, the method for building an index structure according to the embodiment comprises the following steps: step 31 of obtaining at least one JSON document included in a RDB table; step 33 of identifying a plurality of JSON objects in the at least one JSON document and assigning identifiers for the plurality of JSON objects; and step 35 of building an index structure according to values in the plurality of JSON objects such that the index structure includes at least one node which at least records values in a specific JSON object and includes an identifier of the specific JSON object. Below, execution details of the respective steps are described in combination with concrete examples.

First, at step 31, at least one JSON document included in a RDB table is obtained. As shown in FIG. 1A, a RDB table is provided with JSON documents inserted in the long fields of the table as table items. Therefore, by reading the contents in the column of the long fields defined in the RDB table, JSON documents introduced into the RDB table may be obtained.

Then, at step 33, a plurality of JSON objects in the obtained JSON documents are identified and assigned with identifiers. Specifically, in an embodiment, step 33 includes identifying the JSON objects in the JSON document. As known by those skilled in the art, the JSON documents use specific indicative symbols to define the JSON objects and arrays. Specifically, JSON uses a pair of "{ }" to define a JSON object which is a set of unordered key/value pairs. Each pair is represented in a form of "key":"value". The JSON documents further use a pair of IF to define an array which is a set of ordered values. The values constituting an array may be a character string within double quotation marks, a number, a Boolean value, an object or another array. By building further arrays taking objects or arrays as values, the JSON documents may define a nested structure.

Based on the features of the JSON language above, it is easy to identify indicative symbols, e.g. "{ }" so as to identify the JSON objects defined in the JSON document. For instance, in FIG. 1A, by identifying the indicative symbols in the JSON document, it may be determined that the JSON document in the first row defines an array that includes 2 JSON objects each of which are represented by 2 pairs of key/value. Similarly, the JSON document in the second row of the table defines 4 JSON objects, and the JSON document in the third row of the table defines 3 JSON objects.

Based on the identified JSON objects included in the JSON document, in an embodiment, step 33 further comprises assigning identifiers for the identified JSON objects.

In an example, the step above for assigning identifiers comprises assigning global identifiers for the identified JSON objects. Specifically, a plurality of JSON objects in the one or more JSON documents obtained at step 31 may be globally considered such that any JSON object therein has a single ID for identifying it uniquely, so as to form global identifiers. More specifically, in the example of FIG. 1A, the JSON document of the first row defines 2 JSON objects, the JSON document in the second row defines 4 JSON objects, and the JSON document in the third row defines 3 JSON objects. These 9 JSON objects may be assigned with overall global identifiers, e.g., O1, O2, . . . O9, so that a global identifier uniquely corresponds to a certain JSON object in the entire "hospital record" field. Thus, the respective JSON objects are identified by global identifiers.

In an example, the step above for assigning identifiers comprises determining a document ID for the JSON document corresponding to an identified JSON object, assigning object ID within the document for the identified JSON object and taking a combination of the document ID and the object ID as an identifier. A JSON document inserted into the RDB table may be identified by using the row in which the JSON document is located. For instance, the document ID of the JSON document for recording the hospital records of the user1 in FIG. 1A may be represented as Row 0, and the document ID of the JSON document corresponding to user2 may be represented as Row 1. Furthermore, within a certain JSON document, object IDs may be used to identify different JSON objects.

In an example, within a JSON document, object IDs are generated for respective JSON objects so as to identify different JSON objects within the document. FIG. 4 exemplarily shows identifiers assigned for JSON objects according to an embodiment of the present invention. Specifically, in FIG. 4, identifiers are assigned for the JSON objects in the table of FIG. 1A in form of combination of document ID and object ID. For instance, the JSON document corresponding to the JSON object {"hospitalName":"hospital B", "symptom":"symptom B"} is located in the first row of the table and thus has a document ID Row 0; within the document, the above JSON object is the second JSON object, and thus assigned with OID 1 as its object ID. Therefore, the above JSON object can be identified in form of (Row 0, OID 1) or (0, 1); in other words, an identifier in a form of (0, 1) may be assigned for this JSON object.

In an embodiment, JSON path corresponding to a JSON object is used as the object ID for the JSON object. As known by those skilled in the art, similar to the Xpath for an XML document, it has been proposed a JSON path for a JSON document. The JSON path uses symbols stipulated by JSON language to define elements in the JSON document and to extract data from the JSON document. For instance, the JSON path uses "$" to represent a root object/element, "@" to represent the current object/element, and "[ ]" as an array operator. Each JSON object has its own unique JSON path; correspondingly, this JSON path may be used for identifying the corresponding JSON object. For instance, in an example, the JSON object {"hospitalName":"hospital B", "symptom":"symptom B"} might has the following JSON path:/records/hospital[1]/symptom[1]; correspondingly, this JSON path may be used to identify the JSON object above so as to serve as an object ID of the JSON object. As a JSON object naturally corresponds to a JSON path and may be accessed through the JSON path, using the JSON path as object ID of the JSON object avoids the process of regenerating object IDs as shown in FIG. 4. In case of using a JSON path as an object ID, respective JSON objects may be identified using a combination of document ID and JSON path.

It may be appreciated, besides the identifying methods listed above, those skilled in the art, by reading the present description, may identify JSON objects in other or more manners, which shall all be considered as falling within the concept scope of the present invention.

Based on the steps of identifying respective JSON objects and assigning identifiers for them, step 35 is executed to build an index structure according to values in the JSON objects such that the index structure includes at least one node which at least records values in a specific JSON object and includes the identifier of the specific JSON object. It may be appreciated, the prior art has set forth various methods for building an index structure for items in a RDB table. An index structure is usually represented in form of a tree, e.g. a binary tree, a B tree (balanced tree), a B+ tree etc. Below, building of the index structure is described in connection with examples of a B tree and a B+ tree.

A B tree is a common used data structure. In a B tree, an internal (non-leaf) node may have preset number (e.g. more than 2) of child nodes. For instance, in a 2-3 B tree (usually abbreviated as a 2-3 tree), each internal node may only have 2 or 3 child nodes. Each internal node in a B tree may include a number of values. The number of branches (or child nodes) of a node may be larger than number of values it stores by 1. For instance, in a 2-3 B tree, an internal node which stores 1 value may have 2 nodes, and an internal node which stores 2 values may have 3 child nodes.

In a process of generating a B tree, a root node and corresponding child trees are dynamically adjusted so that all the leaf nodes are located at the same depth and thus the B tree is kept in balance. As a result of the balance of B tree, using a B tree as the index structure of a RDB table may significantly reduce intermediate process of locating the records so as to accelerate data access.

Based on the B tree, a similar B+ tree is further proposed in the art. The B+ tree differs from the B tree in the number of values stored at the nodes, and thus in the number of child nodes the nodes have. Due to the differences above, the B tree and the B+ tree may have different characters as following. In a B tree, any value would appear in only one node (which may not necessarily be a leaf node), so the search may end at a non-leaf node, i.e., an internal node. However, in a B+ tree, a value may appear at a plurality of nodes, and would definitely appear in a leaf node; therefore, the search would certainly end at leaf nodes and thus has a fixed searching depth.

An index structure may be built directed to items in a certain field, i.e., items in a certain column, of a RDB table, using a B tree or a B+ tree. In this process, generally, values of respective items in the certain column are respectively recorded in respective nodes of the B tree or the B+ tree, and the nodes are made to include row IDs of recorded items. In case that the certain column above is specified, row IDs may be used for uniquely locating the items recorded by the nodes. Thus, when the search is advanced to a node meeting query conditions, items to be searched may be rapidly located in the database table according to row ID included in the node.

In case of introducing JSON documents in a RDB table, a JSON document as a whole is inserted into the table as an item. An index structure is built taking items in the table as analysis objects, which corresponds to building an index structure based on the whole JSON document. However, as stated above, a JSON document includes a plurality of JSON objects, and the searching manner using the whole JSON document as analysis object does not meet the requirements on query granularity. Therefore, at the preceding step 33, respective JSON objects are identified and assigned with identifiers. This provides the basis for building an index structure based on JSON objects at step 35.

Specifically, at step 35, an index structure is built according to values in JSON objects. As mentioned above, a JSON object is formed of one or more key/value pairs, and the values therein may serve as a basis for building the index structure. This is similar to the process of building an index structure based on values of respective table items in the prior art. However, what is different is, in the methods of the embodiments, the index structure is built directed to JSON objects; therefore, the index structure includes at least one node which at least records values in a specific JSON object and includes the identifier of the specific JSON object. Such an index structure provides a basis for conducting query as to JSON objects. When the search is advanced to a node which meets query conditions, taking the identifier of the JSON object included in the node as a pointer, the JSON object to be searched can be directly located in a database table.

Figure 5:
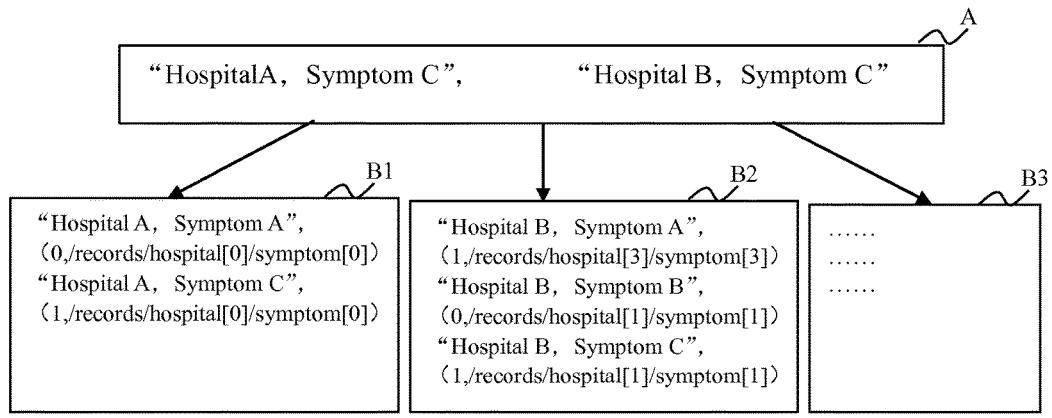
FIG. 5 shows an example of an index structure built according to an embodiment.

FIG. 5 shows an example of an index structure built according to an embodiment. The index structure in the example is built based on the table as shown in FIG. 1A. In the index structure as shown in FIG. 5, the node A stores values of 2 JSON objects and has 3 child nodes B1, B2 and B3. The values recorded in the node A are respectively value 1 of "hospital A, symptom C" and value 2 of "hospital B, symptom C". Correspondingly, the child node B1 may record JSON objects whose values are not greater than the value 1, the child node B2 may record JSON objects whose values are between those of the value 1 and the value 2, and the child node B3 may record JSON objects whose values are greater than the value 2. It is assumed that the nodes B1, B2 and B3 are leaf nodes and are located at the lowest layer of the index structure. For clarity and clearness, FIG. 5 only shows details of nodes B1 and B2. As shown in FIG. 5, the node B1 records values of 2 JSON objects which are not greater than value 1 above. Furthermore, the node B1 correspondingly includes identifiers of the two JSON objects recorded. Similarly, the node B2 records values of 3 JSON objects which are greater than the value 1 above. Furthermore, the node B2 correspondingly includes identifiers of the 3 recorded JSON objects. In the example of FIG. 5, identifiers of the JSON objects are represented in form of a combination of document ID and JSON path. These identifiers may be used as pointers to locate the recorded JSON objects into corresponding positions in a database table. For instance, the node B2 records a value "hospital B, symptom A" of a specific JSON object and includes the identifier (1, /records/hospital[3]/symptom[3]) of the JSON object. Through such an identifier, the JSON object may be located as the fourth JSON object in the JSON document of the second row of the table, as shown in FIG. 1A. Though the example in FIG. 5 shows a combination of document ID and object ID as an identifier of the JSON object, it may be appreciated that the identifier of the JSON object may also be represented in other forms, as long as the identifier may guide to corresponding object as a pointer. It may be appreciated, the index structure as exemplarily shown in FIG. 5 may be a complete index structure generated for a certain column of JSON documents, or it may be a part of a complete index structure. Correspondingly, the node A may be a root node of an index structure, or it may be an intermediate node.

Additionally, as mentioned above, the index structure built at step 35 may be, for example, in a form of a B tree or a B+ tree. In the case that the index structure is in form of a B tree, each node in the index structure is typically made to include complete identifiers of the recorded JSON objects, for the search and query along the B tree might end at any node, including intermediate nodes. In the case that the index structure is a B+ tree, as the search and query always end at a leaf node, at least the leaf nodes of the B+ tree are made to include complete identifiers of the recorded JSON object. For instance, it is assumed that the index structure as shown in FIG. 5 is a B+ tree. Then, the leaf nodes B1, B2 and B3 shall be made to include identifiers of the JSON objects recorded. As to non-leaf node, e.g., node A, in an example, identifiers of recorded JSON objects are still included. However, in another example, the node A may only include a part of identifiers of the recorded JSON objects (for instance, including only the document IDs) or not include the identifiers of the recorded JSON object at all. In such a case, the node A, as an intermediate node, is only used for dividing child trees and forming branches.

It may be appreciated, although the index structure is described in connection with examples of B tree and B+ tree as above, the index structure may also take other structure forms. No matter what form is taken, the index structure built at step 35 is based on values of respective JSON objects instead of using the whole JSON document as analysis object. Furthermore, the nodes in the index structure may include identifiers of recorded JSON objects, so as to locate the recorded JSON objects to corresponding positions in the database table.

Figure 6:
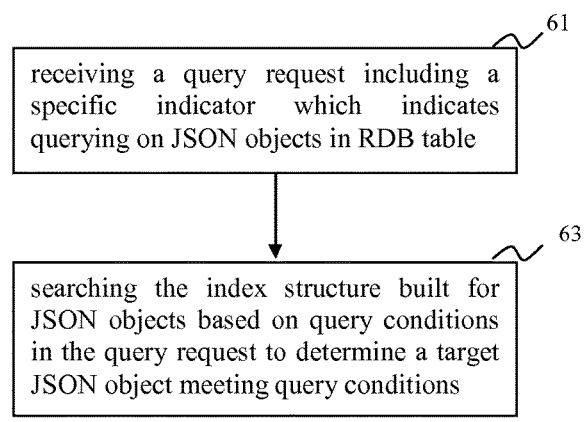
FIG. 6 shows a flowchart of a method for querying a RDB table according to an embodiment.

Based on the index structure built using the method above, one embodiment of the present invention further provides a method for querying a RDB table introducing JSON documents. FIG. 6 shows a flowchart of a method for querying a RDB table according to an embodiment of the present invention. As shown in FIG. 6, at step 61, a query request including a specific indicator is received, the indicator used for indicating that the query is to be performed on JSON objects in at least one JSON document included in the RDB table; and at step 63, the index structure built using the method of FIG. 3 is searched based on query conditions in the query request so as to determine a target JSON object which meets the query conditions.

A query request takes items in the table as querying objects by default. As to a table which includes JSON documents, the query request is typically directed to JSON documents. For instance, a conventional query request is described above, which is used for querying the table in FIG. 1A and reads as: where JSON_VAL ("records.hospitalName")="hospital A" && JSON_VAL ("records.symptom")="symptom A". In order to make the query performed on JSON objects, a specific indicator may be set which indicates querying performed on JSON objects in the RDB table. Correspondingly, when a query engine receives a query request, it may first judge whether the query request includes the specific indicator above or not. If not, the query shall be executed in a conventional manner; if the query request includes the preset specific indicator, the engine performs query directed to JSON objects, i.e., step 63.

It may be appreciated that the specific indicator above may be any indicator as long as the indicator does not conflict with existing query grammar. For instance, in a specific example, "&&" is set as the specific indicator above. Correspondingly, by replacing "AND" in the above-mentioned conventional query request with the specific indicator "&&", the query request is marked as querying directed to JSON objects. Specifically, for instance, a query condition: where JSON_VAL ("records.hospitalName")= "hospital A" && JSON_VAL ("records.symptom")= "symptom A" can be used to query a JSON object whose value is "hospital A, symptom A".

In the case that a query request including the abovementioned specific indicator is received at step 61, at step 63, JSON objects may be queried by searching the index structure built according to the method of FIG. 3. Specifically, in an embodiment, step 63 may comprise (not shown): step 631 of determining a target node which records a target JSON object in the index structure based on values designated in the query conditions; and step 633 of locating the target JSON object in the RDB table using identifier recorded in the target node.

It may be appreciated that, generally, a query request specifies desired returning results by defining query conditions, wherein the query conditions are generally associated with values of items to be queried. In the case of performing query on JSON objects, query conditions relate to values of the JSON objects to be queried. On the other hand, as mentioned above, the nodes in the index structure built according to the method of FIG. 3 may record values of respective JSON objects. Therefore, by traversing the index structure and comparing the values recorded in respective nodes in the index structure to the values specified in the query conditions, a target node may be determined which records the target JSON objects meeting the query conditions. Furthermore, as mentioned above, the nodes in the index structure further include the identifiers of the recorded JSON objects. Therefore, at step 633, by using the identifiers recorded in the target node, the target JSON objects can be located in the database table and the relevant information thereof can be obtained.

Specifically, it is assumed that an index structure as shown in FIG. 5 is built based on the table in FIG. 1A. As mentioned above, the query condition "where JSON_VAL ("records.hospitalName")="hospital A" && JSON_VAL ("records.symptom")="symptom A"" can be used to query JSON objects whose value is "hospital A, symptom A". As to such a query request, at step 631, the index structure as shown in FIG. 5 is traversed to compare the value "hospital A, symptom A" specified in the query condition with the values recorded in respective nodes. Specifically, the node A records 2 values, i.e., value 1: "hospital A, symptom C" and value 2: "hospital B, symptom C". Through the comparison, it may be known that the specified value in the query condition is smaller than value 1, so the process advances to the first child node B1 of node A to continue the comparison, for the node B1 is used for recording JSON objects whose values are not greater than the value 1. By comparing the specified value with the records in the node B1, it may be determined that the value "hospital A, symptom A" recorded in the node B1 matches the specified value, so the JSON object having such value is the target JSON object, and the node B1 which records the target JSON object is the target node. Then, at step 633, according to the identifier, "0, /records/hospital[0]/symptom[0]", of the target JSON object recorded in the target node B1, the target JSON object may be located in the table of FIG. 1A, which means that it may be located as the first JSON object in the JSON document of the first row (Row 0) of the table. Based on this, optionally, further information relevant to the target JSON object, e.g., the corresponding user (user1) and so on, may be obtained.

It can be seen from the above exemplary query process, when the query "hospital A, symptom A" is performed directed to JSON objects, only the hospital record relevant to user1 may be returned. Although the JSON document corresponding to user2 also includes the values "hospital A" and "symptom A", as "hospital A" and "symptom A" are not located in the same JSON object, the hospital record of user2 do not meet the query conditions, and thus it will not be chosen. Therefore, the above query process may avoid or eliminate the possible fault results generated by querying JSON documents in the prior art. Hence, by building an index for JSON objects and performing query on JSON objects, the query granularity is reduced and the query precision is improved.

Figure 7:
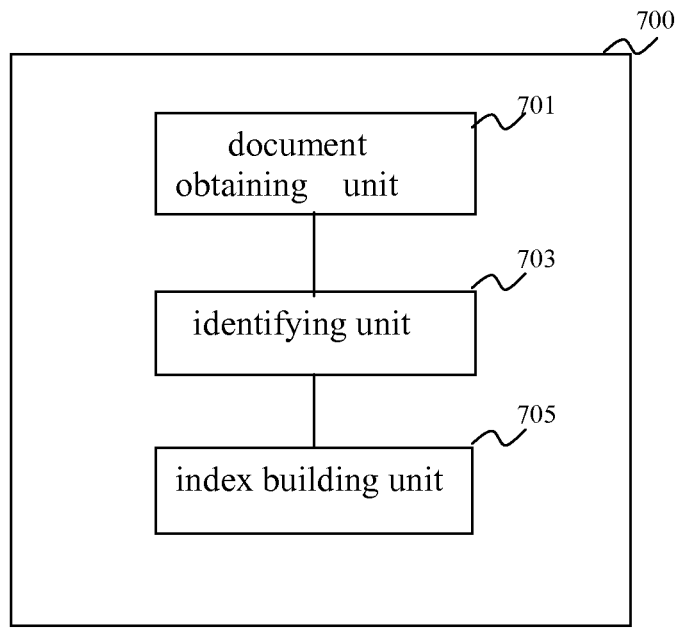
FIG. 7 shows a block diagram of an apparatus for building an index structure according to an embodiment.

Based on the same inventive concept, the present invention further provides an apparatus for building an index structure for a RDB table including JSON documents. FIG. 7 shows a block diagram of an apparatus for building an index structure according to an embodiment of the present invention. As shown in the Figure, the apparatus for building the index structure is indicated as 700 as a whole. Specifically, the apparatus 700 comprises: a document obtaining unit 701 configured to obtain at least one JSON document included in the RDB table; an identifying unit 702 configured to identify a plurality of JSON objects in the at least one JSON document and assign identifiers for the plurality of JSON objects; and an index building unit 703 configured to build an index structure according to values in the plurality of JSON objects such that the index structure includes at least one node which at least records values in a specific JSON object and includes an identifier of the specific JSON object.

In an embodiment, the document identifying unit 701 above is configured to identify the plurality of JSON objects by identifying indicative symbols in the at least one JSON document.

According to an embodiment, the identifying unit 703 is configured to assign global identifiers for identified JSON objects.

According to another embodiment, the identifying unit 703 is configured to determine document IDs for JSON documents corresponding to the identified JSON objects, assign object IDs within documents for the identified JSON objects and combine the document IDs and the object IDs as the identifiers.

In an embodiment, the identifying unit 703 is further configured to generate object IDs for the identified JSON objects.

In another embodiment, the identifying unit 703 is further configured to use JSON paths corresponding to the identified JSON objects as the object IDs thereof.

According to an embodiment, the node is a leaf node of the index structure.

Figure 8:
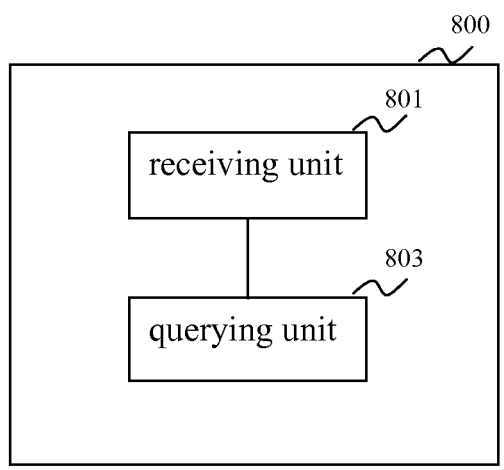
FIG. 8 shows a block diagram of a querying apparatus according to an embodiment.

According to an embodiment of another aspect, the present invention further provides an apparatus for querying a RDB table including JSON documents. FIG. 8 shows a block diagram of a querying apparatus according to an embodiment of the present invention. As shown in the Figure, the apparatus for querying a RDB table including JSON documents is indicated as 800 and comprises: a receiving unit 801 configured to receive a query request including a specific indicator which indicates that the query is to be performed on JSON objects in at least one JSON document included in the RDB table; and a querying unit 803 configured to search the index structure built using the apparatus 700 mentioned above based on query conditions in the query request so as to determine a target JSON object which meets the query conditions.

According to an embodiment, the querying unit 803 above is configured to determine a target node which records the target JSON object in the index structure based on values specified in the query conditions; and locate the target JSON object in the RDB table using the identifier recorded in the target node.

The respective units in FIGS. 7 and 8 are divided according to functions, so the respective units may reside in the same or different physical platforms. In an embodiment, the apparatuses 700 and 800 respectively serve as independent apparatuses and tools. In another embodiment, the apparatuses 700 and 800 may be integrated together as a whole as a tool for improving the query function. In an embodiment, the apparatus 800 may be included in an existing query engine; furthermore, in another embodiment, the apparatus 800 may further be implemented as a tool or component independent of the existing query engine. Concrete implementing manners of respective units in FIGS. 7 and 8 correspond to descriptions of respective steps in FIGS. 3 and 6 with reference to concrete examples, and thus will not be detailed again.

Using the apparatus in FIG. 7, an index structure may be built directed to JSON objects in a RDB table, and by using the apparatus in FIG. 8, JSON objects may be queried based on the index structure built above. Thus, for a RDB table including JSON documents, the query granularity can be reduced and the query precision and accuracy can be improved.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for building an index structure for a relational database table, comprising:
   obtaining at least one JavaScript Object Notation (JSON) document from the relational database table;
   identifying a plurality of JSON objects in the at least one JSON document and assigning identifiers for the plurality of JSON objects, the assigning identifiers for the plurality of JSON objects includes assigning the identifiers based on a relative position of the JSON objects in the at least one JSON document;
   wherein identifying the plurality of JSON objects in the at least one JSON document comprises identifying indicative symbols in the at least one JSON document, wherein the symbols are in pairs represented in a form of key:value; and
   wherein a value comprises one or more of an array having a character string within double quotation marks, a number, a Boolean value, an object and another array;
   combining a document identifier (ID) of the least one JSON document with each of the assigned identifiers of the plurality of JSON objects to create a global identifier (ID) for each of the plurality of JSON objects, wherein the document ID referenced by a corresponding column in the relational database table in which the at least one JSON document is stored; and
   building the index structure according to values in the plurality of JSON objects such that the index structure includes at least one node which records the values in one of the plurality of JSON objects and includes a corresponding global identifier of the at least one JSON document and the one of the plurality of JSON objects.

2. The method of claim 1, wherein assigning the object identifications (IDs) within the JSON documents for the identified JSON objects comprises generating the object IDs for the identified JSON objects.

3. The method of claim 1, wherein assigning the object IDs within the JSON documents for the identified JSON objects comprises using JSON paths corresponding to the identified JSON objects as the object IDs.

4. The method of claim 1, wherein the at least one node is a leaf node of the index structure.

5. A method for querying a relational database table, comprising:
  defining an indicator in a query grammar that specifies a query is directed to JSON objects in at least one JSON document included in the relational database table, the indicator indicative of symbols in the at least one JSON document;
  wherein the symbols are in pairs represented in a form of key:value; and
  wherein a value comprises one or more of an array having a character string within double quotation marks, a number, a Boolean value, an object and another array;
  receiving a query request;
  determining whether the query request contains the indicator;
  upon determining the query request contains the indicator, searching an index structure based on query conditions in the query request, and determining a target JSON object that meets the query conditions; and
  upon determining the query request does not contain the indicator, performing a default search of the relational database table according to query conditions in the query request.

6. The method of claim 5, wherein determining the target JSON object meets the query conditions comprises:
  determining a target node that records the target JSON object in the index structure based on values specified in the query conditions; and
  locating the target JSON object in the relational database table using an identifier recorded in the target node.

7. An apparatus for building an index structure for a relational database table, comprising:
  a memory storing program instructions; and
  a computer processor configured to execute the program instructions, the program instructions performing the program instructions performing:
  obtaining at least one JSON document from the relational database table;
  identifying a plurality of JSON objects in the at least one JSON document and assigning identifiers for the plurality of JSON objects, the assigning identifiers for the plurality of JSON objects includes assigning the identifiers based on a relative position of the JSON objects in the at least one JSON document;
  wherein identifying the plurality of JSON objects in the at least one JSON document comprises identifying indicative symbols in the at least one JSON document, wherein the symbols are in pairs represented in a form of key:value; and
  wherein a value comprises one or more of an array having a character string within double quotation marks, a number, a Boolean value, an object and another array;
  combining a document identifier (ID) of the least one JSON document with each of the assigned identifiers of the plurality of JSON objects to create a global identifier (ID) for each of the plurality of JSON objects, wherein the document ID referenced by a corresponding column in the relational database table in which the at least one JSON document is stored; and
  building the index structure according to values in the plurality of JSON objects such that the index structure includes at least one node which records the values in one of the plurality of JSON objects and includes a corresponding global identifier of the at least one JSON document and the one of the plurality of JSON objects.

8. The apparatus of claim 7, wherein the identifying unit is further configured to generate the object identifications (IDs) for the identified JSON objects.

9. The apparatus of claim 7, wherein the identifying unit is further configured to use JSON paths corresponding to the identified JSON objects as the object IDs.

10. The apparatus of claim 7, wherein the at least one node is a leaf node of the index structure.

11. An apparatus for querying a relational database table, comprising:
  a memory storing program instructions; and
  a computer processor configured to execute the program instructions, the program instructions performing the program instructions performing:
  defining an indicator in a query grammar that specifies a query is directed to JSON objects in at least one JSON document included in the relational database table,
  the indicator indicative of symbols in the at least one JSON document;
  wherein the symbols are in pairs represented in a form of key:value; and
  wherein a value comprises one or more of an array having a character string within double quotation marks, a number, a Boolean value, an object and another array;
  receiving a query request;
  determining whether the query request contains the indicator;
  upon determining the query request contains the indicator, searching an index structure based on query conditions in the query request, and determine a target JSON object that meets the query conditions; and
  upon determining the query request does not contain the indicator, performing a default search of the relational database table according to query conditions in the query request.

12. The apparatus of claim 11, wherein the querying unit is configured to:
  determine a target node that records the target JSON object in the index structure based on values specified in the query conditions; and
  locate the target JSON object in the relational database table using an identifier recorded in the target node.

* * * * *